United States Patent [19]

Förster et al.

[11] 3,849,718

[45] Nov. 19, 1974

[54] METHOD FOR CONTROLLING A RECTIFIER CIRCUIT WITH CONTROLLED RECTIFIERS AND ASSOCIATED QUENCHING DEVICES

[75] Inventors: Johannes Förster; Karl-Heinz Bezold; Helmut Niehage, all of Berlin, Germany

[73] Assignee: Licentia Patent-Verwaltungs GmbH, Frankfurt, Germany

[22] Filed: Dec. 26, 1972

[21] Appl. No.: 318,410

[30] Foreign Application Priority Data
Dec. 30, 1971 Germany.............................. 2165959

[52] U.S. Cl................... 321/40, 318/138, 321/45 C
[51] Int. Cl. .......................................... H02k 29/02
[58] Field of Search............ 307/252 M; 321/38, 40, 321/45 C; 318/138

[56] References Cited
UNITED STATES PATENTS
3,536,985  10/1970  Ekstrom........................... 321/40 X
3,629,613  12/1971  Feige.............................. 307/252 M FOREIGN PATENTS OR APPLICATIONS
1,124,263  8/1968  Great Britain....................... 321/40

Primary Examiner—A. D. Pellinen
Attorney, Agent, or Firm—Spencer & Kaye

[57] ABSTRACT

In a method and corresponding circuitry for controlling a rectifier circuit having a controlled rectifier, the controlled rectifier is fired at an electrical angle α and is quenched at an electrical angle β. A circuit arrangement is provided for establishing a quenching period during which quenching of the controlled rectifier occurs. This quenching period begins at an electrical angle after the A.C. supply current has reached its maximum value and ends prior to the electrical angle at which the A.C. supply voltage subsequently crosses through zero. The controlled rectifier is quenched at an angle β lying within the quenching period and having a value which is adjustable in dependence on a momentary value of the A.C. supply current.

5 Claims, 8 Drawing Figures

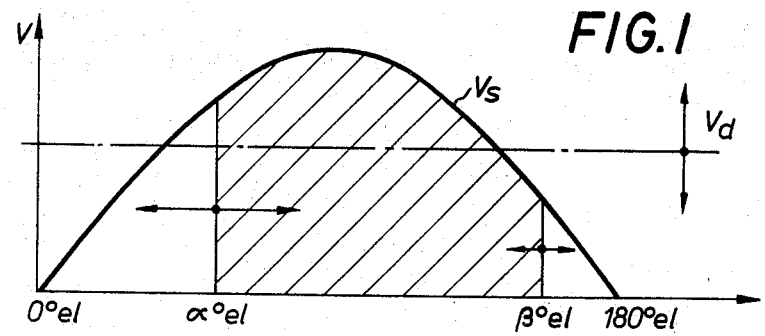
FIG.1
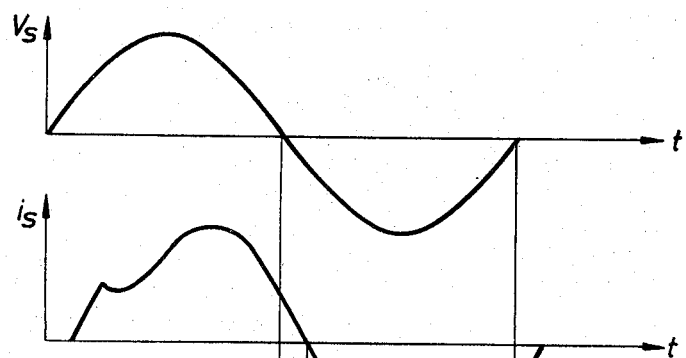
FIG.3a
FIG.3b
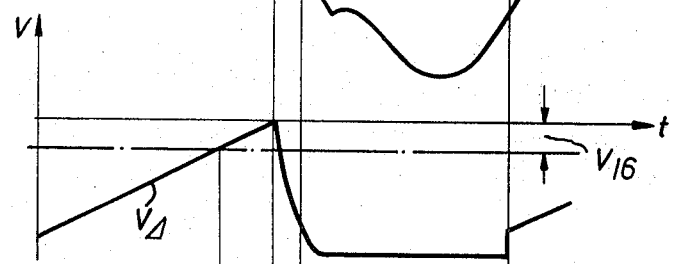
FIG.3c
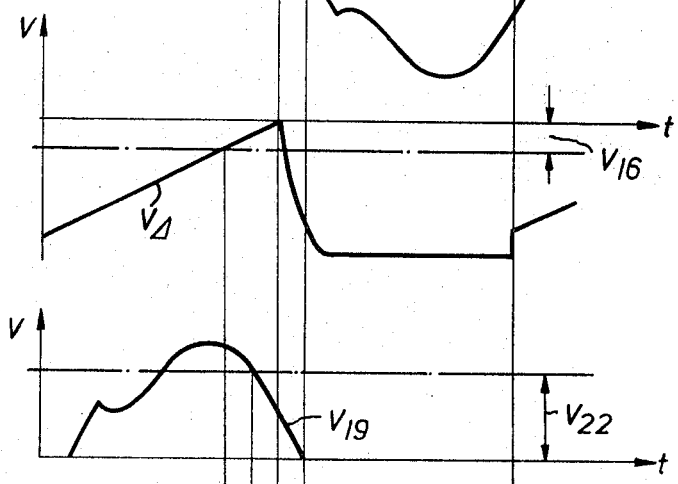
FIG.3d
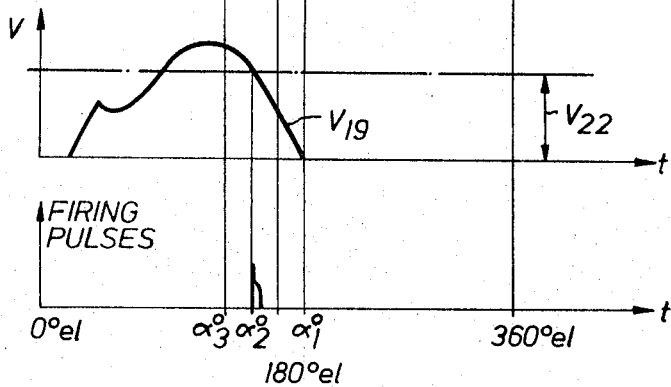
FIG.3e

METHOD FOR CONTROLLING A RECTIFIER CIRCUIT WITH CONTROLLED RECTIFIERS AND ASSOCIATED QUENCHING DEVICES

BACKGROUND OF THE INVENTION

The present invention relates to a method and a corresponding circuit arrangement for controlling the operation of a rectifier circuit with controlled rectifiers and associated quenching devices by firing the controlled rectifiers at an arbitrarily settable firing angle $\alpha$.

The rectified output voltage of a controlled rectifier circuit is adjusted by controlling the duration and position of the current flowing in the controlled rectifiers. The duration and position of the current flow and thus the amplitude of the rectified voltage is generally varied by delaying the triggering of the controlled rectifiers for a selected period of time after a positive voltage has been applied to the respective rectifier. This produces, in addition to the reactive commutation power, a substantial amount of reactive control power which is a result of the phase difference between the voltage and the lagging rectifier or phase current. Because of a low power factor $\lambda$ or displacement factor $\cos \phi$, there exists a substantial reactive power requirement for the controlled rectifier which not only causes additional losses but also leads to voltage drops so that the power lines and particularly the rectifier circuit transformers must be designed for considerably higher power than would be necessary merely for the power to be transmitted. To reduce this requirement for inductive reactive power in the controlled rectifiers or to increase the power factor, respectively, asymmetrically half-wave rectifier circuits with quenchable controlled rectifiers are used, the controlled rectifiers being quenched with the aid of capacitors and thyristors.

By displacing the triggering and quenching points of the controlled rectifier, the edges of the rectified voltage are shifted during the half-period of the alternating voltage applied to the rectifier and thus the arithmetic mean of the rectified voltage can be selectively increased or reduced. Due to the transient voltage, which occurs in the circuit when the controlled rectifier is quenched and which is a result of the stored magnetic energy in the circuit which is interrupted, additional stresses may occur in the circuit elements of such rectifier arrangements. This is one of the reasons why this method of controlling a rectifier circuit has not been generally accepted.

SUMMARY OF THE INVENTION

An object of the present invention is to provide a method which permits operation of a controlled rectifier circuit with the highest possible power factor without causing stresses on the components of the rectifier circuit as a result of undue voltage increases due to quenching of the controlled rectifiers.

This is accomplished according to the present invention in that the controlled rectifiers are quenched within a settable quenching region existing in a period after the maximum of the rectifier current to be quenched and prior to the subsequent zero crossing of the alternating supply voltage at a quenching angle $\beta$ which is adjusted in dependence on the momentary value of the rectifier current to be quenched.

BRIEF DESCRIPTION OF THE DRAWINGS

FIG. 1 shows a half-period of the A.C. supply voltage with the firing angle $\alpha$ and quenching angle $\beta$ indicated in accordance with the present invention.

FIG. 3 (a–e) shows current and voltage curves for various circuit elements of the rectifier arrangement of FIG. 2.

DESCRIPTION OF THE PREFERRED EMBODIMENTS

FIG. 1 shows a half-period of an A.C. supply voltage $V_s$ as well as the arithmetic mean $V_d$ of the rectified voltage which results from the voltage period shown in hatching. This voltage period is obtained by firing the respective controlled rectifier at an electrical angle $\alpha°$ and quenching it at an electrical angle $\beta°$. According to the present invention, the moment of quenching is set at $\beta°$ so that the voltage increase resulting from the quenching of the controlled rectifier remains below the peak value of the alternating supply voltage and the angle $\beta°$ is varied only within narrow limits in dependence on the momentary value of the current to be quenched which flows through the respective rectifier. To expand or reduce the voltage period and thus the arithmetic mean $V_d$ of the rectified voltage the firing angle $\alpha°$ is displaced toward lower or higher values, respectively. In this way the power factor $\lambda$ is substantially increased with respect to the operation of a rectifier circuit with commutation of the current-conducting rectifier after zero passage of the alternating supply voltage and thus the load on the lines is reduced. This known method for improving the power factor $\lambda$ of the rectifier circuit is used together with the quenching of the respective current-conducting controlled rectifier at a point in time at which the danger of the occurrence of excess voltages within the rectifier circuit does not exist.

Excess voltages which occur at the secondary terminals of the rectifier circuit transformer are caused since at the moment of quenching of the rectifier which is carrying current at this moment the alternating current in the rectifier circuit transformer is interrupted. The magnetic energy E stored in the inductances of the A.C. circuit is $$E = \tfrac{1}{2} L i^2$$

where $L$ is the resulting inductance of the A.C. circuit (transformer winding, input and output lines) and $i$ is the momentary value of the A.C. supply current. This energy must be absorbed by the quenching capacitors which are utilized to quench the controlled rectifiers and consequently the energy balance equation proves that:

$$E = \tfrac{1}{2} L i^2 = \tfrac{1}{2} C (\hat{V}^2 - V_L^2)$$

where C is the capacitance and $V_L$ is the voltage at the quenching capacitors before quenching and $\hat{V}$ after quenching.

Figure 2:
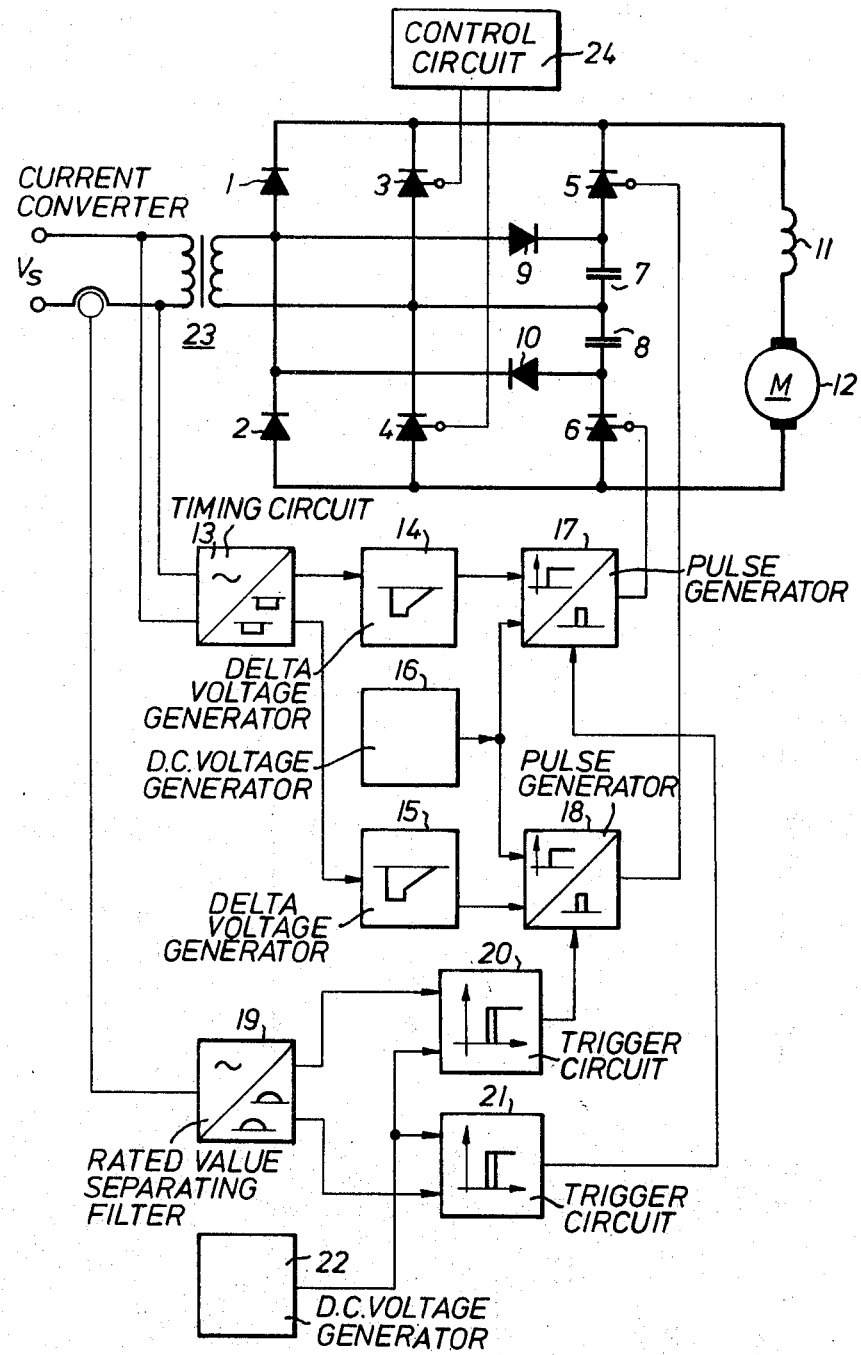
FIG. 2 shows a block diagram circuit of a rectifier arrangement for performing the method of the present invention.

The circuit arrangement shown in FIG. 2, for performing the method of the present invention includes a bridge rectifier circuit with controlled rectifiers 3, 4 in two of the rectifier branches and noncontrollable rectifiers or diodes 1,2 in the other two rectifier branches. A transformer 23 has its secondary winding disposed in the diagonal of the bridge and its primary winding connected to the alternating supply voltage $V_s$. A quenching device is associated with each one of the controlled rectifiers 3,4 and includes a series connection of a quenching thyristor 5 or 6, respectively, and a quenching capacitor 7 or 8, respectively. Charging diodes 9, 10 connected to the secondary of the transformer 23 are provided to control the charging path for charging the quenching capacitors 7, 8 respectively. The load on the D.C. output side of the bridge rectifier circuit is as shown by the series connection of smoothing inductance 11 with a D.C. motor 12. While the controlled rectifiers 3, 4 receive their firing pulses from a control circuit 24 in the conventional manner, pulse generators 17 and 18 generate the firing pulses for the quenching thyristors 5, 6 which cause the quenching capacitor 7 or 8, respectively, which are connected in series therewith, to be discharged. The discharge of the quenching capacitor 7 or 8 provides the current pulse for causing the associated rectifier 3 or 4, respectively, to be quenched. Each of the pulse generators 17 and 18 is formed of conventional components, for example, a Schmitt Trigger the output of which is connected through a condenser or another differentiating circuit with the input of a transistor, the collector current of which is used as the firing pulse for the quenching thyristor 5 or 6, respectively.

The pulse generators 17 and 18 for generating the firing pulses for the thyristors 5,6 produce these firing pulses by comparing a line synchronized delta voltage signal with a direct voltage signal. The delta voltage signals are produced in delta voltage generators 14, 15 each of which is synchronized with a respective half-period of the A.C. supply voltage and whose outputs are connected to one input of the pulse generators 17 and 18 respectively. The synchronization is provided by a timing circuit 13 which receives the A.C. supply voltage from the primary coil of the transformer 23 and generates two timing signals one for each half-period of the A.C. supply voltage. Each of the timing signals is connected to a respective one of the delta voltage generators 14, 15 for synchronizing same with a respective one of the half-periods of the A.C. supply voltage. The direct voltage signal applied to the other input of pulse generators 17 and 18 is produced by the D.C. voltage generator 16, whose output value can be adjusted so as to enable the direct voltage to be selected. If desired the D.C. generator can be replaced by a control circuit. The delta voltage signals from the delta generators 14, 15 are then compared during their respective period with the direct voltage signal and this comparison controls the initiation of the pulse signals by the pulse generators 17, 18, respectively.

Figure 4:
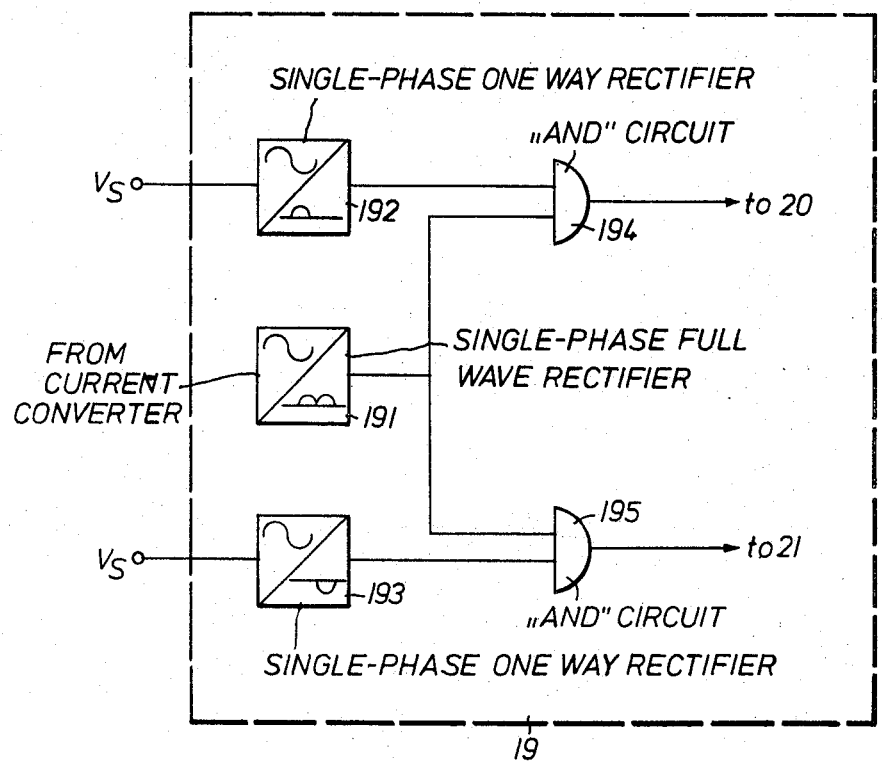
FIG. 4 shows a block diagram circuit of the rated value separating filter arrangement of FIG. 2.

Two flip stages, or trigger circuits, 20, 21 are connected to the pulse generators 17, 18, respectively, and control or gate the emission of the firing pulses from pulse generators 17, 18 to the quenching thyristors 5,6. These flip stages can for example be Schmitt trigger circuits. The flip stages 20, 21 generate gating signals for enabling the pulse outputs of the pulse generators when the alternating supply current which is monitored by a rated value separating filter 19 connected between the primary coil of transformer 23 via a current converter and each of the flip stages 20, 21, has fallen under a set D.C. voltage threshold value. This threshold value is set by the output signal of the second direct voltage generator 22 whose output is directly connected to one input of each of the two flip stages 20, 21. The rated value separating filter 19, as shown in FIG. 4, is formed, for example, of a single-phase full wave rectifier 191, two single-phase one way, i.e. half wave, rectifiers 192,193 and two "And"-circuits 194,195. The input of the single-phase full wave rectifier 191 is connected with the current converter and the output of the rectifier is connected with one input of each of the two AND-circuits 194,195. The single-phase one way rectifiers 192,193 are connected with the supply voltage $V_s$ such that one rectifier rectifies the first one-half wave of the supply voltage and the other rectifier rectifies the second one-half wave of the supply voltage. Each of the outputs of the single-phase one way rectifiers is connected with one input of one of the AND-circuits 194,195.

The operation of the circuit arrangement of FIG. 2 will be explained with the assistance of the signal curves shown in FIG. 3. A possible example of an alternating supply voltage signal $V_s$ is shown in FIG. 3a and a corresponding alternating supply current is in FIG. 3b. FIG. 3c shows the corresponding line synchronized delta voltage signal produced by the delta voltage generator 14 or 15. FIG. 3d shows the voltage signal at the output of the rated value separating filter 19. The signal $V_\Delta$ from one of the delta generators 14, 15 is compared with the direct voltage signal $V_{16}$ and the intersection of these signals initiates the respective pulse generator 17, 18. The signal $V_{19}$ from the separating filter 19, is compared with the direct voltage signal $V_{22}$ so as to initiate the respective trigger circuit 20, 21 the output of which determines the moment of gating the output of the pulse generator 17, 18 for providing the firing pulse to the respective quenching thyristor 5 or 6.

If, for example, the operation of the rectifier circuit is assumed to be weakly inductive then, as shown in FIG. 3b, with the zero crossing of the alternating supply voltage being at 180° as shown in FIG. 3a, the alternating supply current is crosses zero at an electrical angle $\Delta_1 > 180°$ where the angle $\alpha$ in FIG. 3 is related to the firing of the quenching thyristors 5 and 6. As shown in FIG. 3c, the intersection of the delta voltage $V_\Delta$ which is synchronized with the alternating supply voltage $V_s$ and the direct voltage $V_{16}$ furnished by the first direct voltage generator 16 determines the front position $\alpha_3$ which is the beginning of the period for firing of the quenching thyristors 5,6. Since the moment of firing the quenching thyristors 5 and 6 substantially corresponds to the moment of quenching $\beta$ of the associated controlled rectifiers, the determination of the position $\alpha_3$ also determines the beginning of the quenching period in the controlled rectifiers 3 and 4. This front position $\alpha_3$ of the firing angle for the quenching thyristors 5 and 6 may be varied as can be easily seen from FIG. 3c, by increasing or reducing the direct voltage $V_{16}$.

As discussed above in the description of FIG. 2, the emission of the pulse signal by the pulse generators 17, 18 is blocked by the flip stages 20,21 until the alternating supply threshold current, which has been monitored in the rated value separating filter 19 and has there been divided into two separate voltages $V_{19}$ representative of each respective half-period of the alternating supply current, falls below the thershold value given by the second direct voltage generator 22 as a direct voltage signal $V_{22}$. As can be seen from FIG. 3d, this occurs at an angle $\alpha_2$. Since at this time the requirement is also met that the synchronized delta voltage $V_\Delta$ has exceeded the voltage level $V_{16}$ given by the first direct voltage generator 16, the respective pulse generator 17 or 18 will emit a firing pulse at the angle $\alpha_2$ to the associated quenching thyristor 5 or 6, respectively, and thus cause the respective controlled rectifier 3 or 4 to be quenched at a corresponding angle $\beta$.

In summary, with this mode of operation with the circuit arrangement of the present invention the following results are obtained:

a. the arithmetic mean of the rectified voltage is varied by displacing the firing angle $\alpha$ of the controlled rectifiers 3 and 4;

b. the power factor $\lambda$ of the rectifier circuit operation is increased by quenching the controlled rectifiers 3 and 4 at an angle $\beta$ before the zero passage of the alternating supply voltage; and c. the controlled rectifiers 3 and 4 are quenched in dependence on the momentary value of the rectifier current which is to be quenched so that the resulting increase in the voltage remains below the peak value of the alternating supply voltage.

It will be understood that the above description of the present invention is susceptible to various modifications, changes and adaptations, and the same are intended to be comprehended within the meaning and range of equivalents of the appended claims.

We claim:

1. In a method for controlling a rectifier circuit for an A.C. supply voltage and a corresponding A.C. supply current having a controlled rectifier and quenching means for the controlled rectifier, the quenching means being connected in parallel with the controlled rectifier and having a quenching thyristor and a quenching capacitor, the method including firing the controlled rectifier at an adjustably selected firing electrical angle $\alpha$ and the improvement comprising the steps of:

establishing a quenching period between the electrical angle after which the A.C. supply current has reached its maximum value and prior to the electrical angle at which the A.C. supply voltage subsequently crosses through zero, said step of establishing a quenching period including the steps of producing a delta voltage signal in synchronism with a half-period of the A.C. supply voltage, producing a selectively variable first D.C. voltage signal, and comparing the delta voltage signal with the first D.C. voltage signal to determine the electrical angle of intersection of the delta voltage signal and the first D.C. voltage, said angle of intersection determining the beginning of the quenching period;

quenching the controlled rectifier at a quenching electrical angle $\beta$ lying within said quenching period, and whose value is adjusted in dependence on a momentary value of the A.C. supply current, so that upon quenching of the controlled rectifier the resulting increase in voltage in the rectifier circuit is below the peak value of the A.C. supply voltage, said step of quenching at the adjustable angle $\beta$ including the steps of producing a selectively variable second D.C. voltage, comparing a voltage signal representative of the half-period of the A.C. supply current with the second D.C. voltage signal, and controlling the quenching means for the controlled rectifier, by firing the quenching thyristor, to quench the controlled rectifier at the electrical angle following the beginning of the quenching period when the voltage signal representative of the A.C. supply current falls below the second D.C. voltage signal.

2. A method as defined in claim 1 wherein said step of comparing the first D.C. voltage signal and the delta voltage signal includes producing a quenching voltage signal for the duration of said quenching period; and wherein said step of quenching further includes: generating a gating signal when, as a result of said step of comparing, the voltage signal representative of the A.C. supply current falls below the second D.C. voltage signal, and utilizing the gating signal to gate the quenching voltage to the quenching means in order to initiate the quenching of the controlled rectifier.

3. In a circuit arrangement for controlling a rectifier circuit for an A.C. supply voltage, and corresponding A.C. supply current, having a controlled rectifier, firing means for firing the controlled rectifier at an adjustably selected firing electrical angle $\alpha$ and quenching means for quenching the controlled rectifier at a quenching electrical angle $\beta$, the quenching means including a circuit connected in parallel with the controlled rectifier and including a quenching capacitor and a controlled quenching thyristor connected in series and means including a charging diode connected to the series connection of the quenching capacitor and control quenching thyristor for charging the quenching capacitor, the improvement comprising:

a pulse means for producing a pulse signal output during an adjustable period between the electrical angle at which the A.C. supply current has reached its maximum value and the angle at which the A.C. supply voltage subsequently crosses through zero thereby defining a quenching period, said pulse means including a delta voltage generating means for producing a delta voltage signal, timing means responsive to the A.C. supply voltage for synchronizing the intitation of the delta voltage means with a half-period of the A.C. supply voltage, a first D.C. voltage generating means for generating a selectively variable first D.C. voltage signal, a first comparing means for comparing the delta voltage signal with the first D.C. voltage signal and for producing a pulse at the electrical angle of intersection between the delta voltage signal and the first D.C. Voltage signal thereby establishing the beginning of the quenching period;

control means, connected to said pulse means, for producing a gating signal during the quenching period, and at a quenching electrical angle $\beta$ which is adjustable in dependence on a momentary value of the A.C. supply current, for gating the pulse signal output of said pulse means, said control means including angle selecting means for adjustably selecting the quenching angle $\beta$ within the quenching period so that upon quenching said controlled rectifier the resulting increase in voltage is below the peak value of the A.C. supply voltage, said angle selecting means including a second D.C. voltage generating means for producing a selectively variable second D.C. voltage signal, a means for producing a voltage signal representative of a half-period of the A.C. supply current, a second comparing means for comparing the voltage signal representative of the A.C. supply current with the second D.C. voltage signal and producing the gating signal for gating said pulse means at an electrical angle following the beginning of the quenching region when the voltage signal representative of the A.C. supply current falls below the second D.C. voltage signal; and connecting means for connecting the gated pulse signal output of said pulse means to said control quenching thyristor for initiating the quenching of said controlled rectifier.

4. A circuit arrangement as defined in claim 3 wherein said means for producing a voltage signal representative of the A.C. supply current includes a rated value separating filter connected to the incoming signal via a current converter.

5. A circuit arrangement as defined in claim 4 wherein: said rectifier circuit is a full wave rectifier having first and second branches having therein first and second controlled rectifiers respectively, each of said controlled rectifiers having a said quenching means associated therewith, said pulse means produces a pulse signal output during each half-period of the A.C. voltage; said delta voltage generating means includes a first and second delta voltage generators, said timing means is connected to both said first and second delta voltage generators for initiating said delta voltage generators during alternating half-periods of the A.C. voltage; said first comparing means includes a first and second comparators associated with said first and second delta voltage generators respectively for establishing the beginning of the quenching period for said first and second controlled rectifiers respectively, said means for producing a voltage signal representative of the A.C. supply current produces a voltage representative of each half-period of the A.C. supply current; and said second comparing means including first and second gating comparators each producing gating signals during alternating half-periods of the A.C. supply current, the outputs of said first and second gating comparators being connected to said first and second comparators respectively.

\* \* \* \* \*